J. J. MICHALSKI.
THEFT DETECTOR FOR AUTOMOBILES.
APPLICATION FILED AUG. 8, 1921.
1,414,521.
Patented May 2, 1922.
2 SHEETS—SHEET 1.
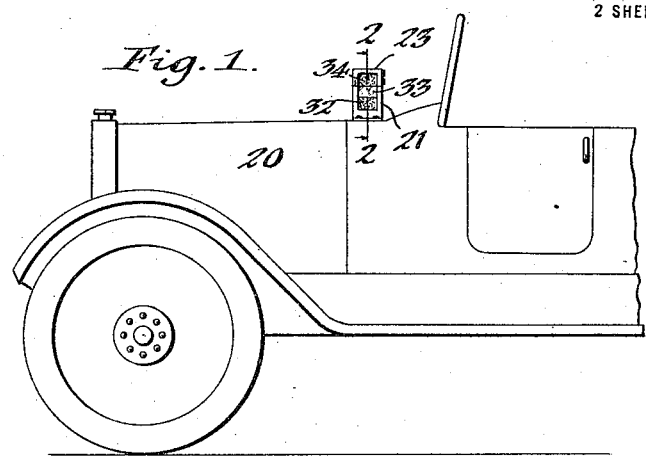
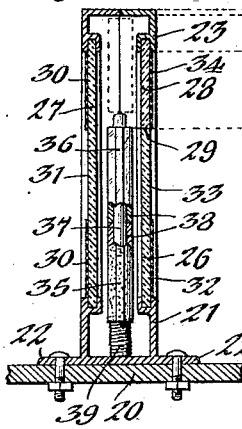 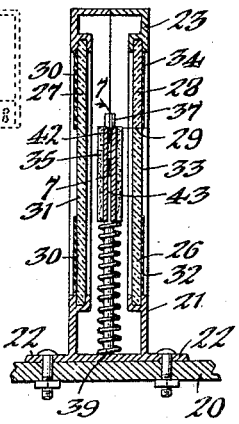 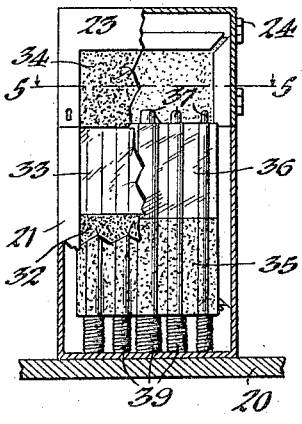
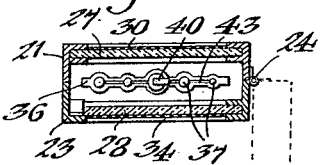
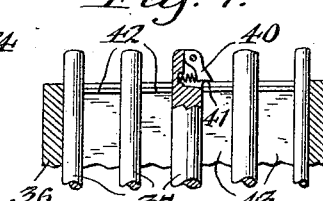
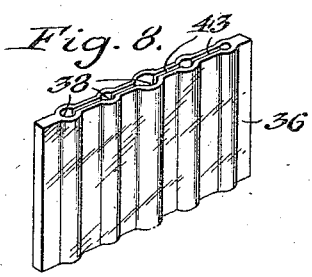
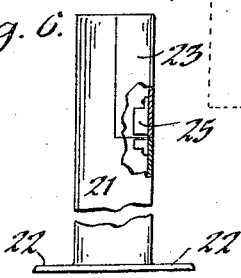
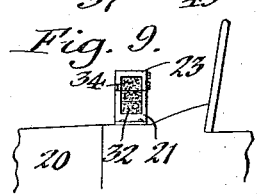
Inventor,
Joseph J. Michalski,
by Geyer Popp
Attorneys.

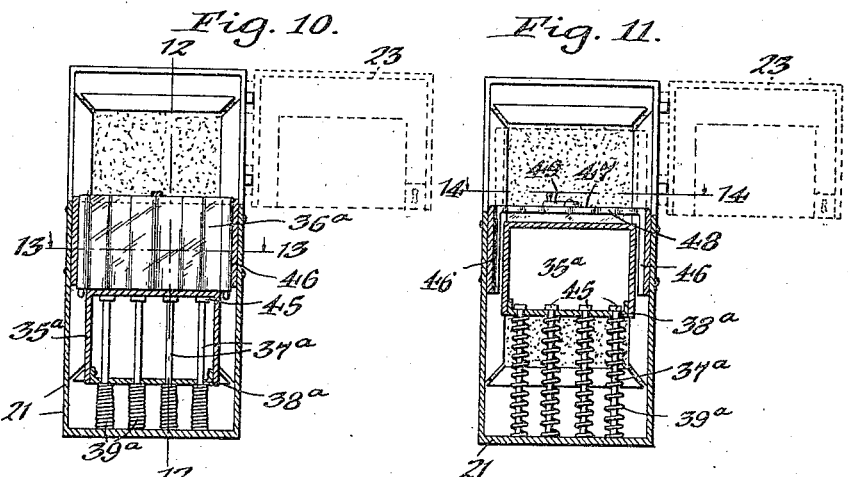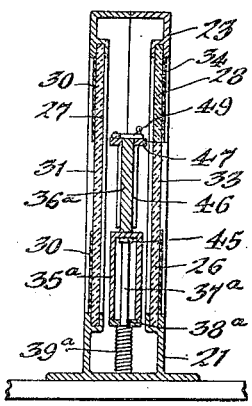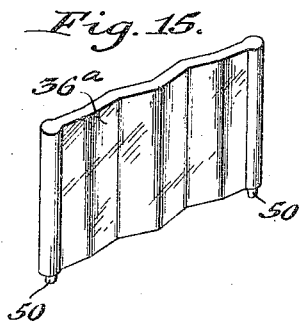

UNITED STATES PATENT OFFICE.

JOSEPH J. MICHALSKI, OF BUFFALO, NEW YORK.

THEFT DETECTOR FOR AUTOMOBILES.

1,414,521.

Specification of Letters Patent. Patented May 2, 1922.

Application filed August 8, 1921. Serial No. 490,786.

*To all whom it may concern:*

Be it known that I, JOSEPH J. MICHALSKI, a citizen of the United States, residing at Buffalo, in the county of Erie and State of New York, have invented new and useful Improvements in Theft Detectors for Automobiles, of which the following is a specification.

This invention relates to a detector or identifying device for protecting automobiles and similar vehicles from theft.

The principal object of the invention is to provide an improved device of this character which is conspicuous and visible from either side of the vehicle so that policemen and others may readily detect whether or not the vehicle is being driven by the owner or some unauthorized person.

Other objects are to provide a visible detector which is simple and compact in construction, which can be manufactured at a moderate cost, and which can be readily installed and conveniently manipulated.

In the accompanying drawings: Figure 1 is a fragmentary side elevation of an automobile showing the improvement applied thereto with the presence-indicating member in position. Figure 2 is an enlarged transverse vertical section on line 2—2, Fig. 1. Figure 3 is a sectional view similar to Fig. 2, but showing the presence-indicating member removed and the absence-indicating member in position. Figure 4 is a sectional side elevation of the improvement with the presence-indicating member in position. Figure 5 is a horizontal section on line 5—5, Fig. 4. Figure 6 is a fragmentary sectional end view of the improvement. Figure 7 is an enlarged fragmentary section on line 7—7, Fig. 3. Figure 8 is a perspective view of one of the indicating members. Figure 9 is a view similar to Fig. 1, but showing the absence-indicating member in position. Figure 10 is a sectional elevation of a modified form of the improvement, showing the presence-indicating member in position. Figure 11 is a view similar to Fig. 10, but showing the absence-indicating member in position. Figure 12 is a transverse vertical section on line 12—12, Fig. 10. Figures 13 and 14 are horizontal sections on the correspondingly numbered lines in Figs. 10 and 11, respectively. Figure 15 is a perspective view of the presence-indicating member employed in the modified form of the improvement.

Similar characters of reference indicate corresponding parts throughout the several views.

By way of example, the improvement is shown as applied to the upper front side of the body 20 of an automobile, although the same may be located at any other accessible place where it is conspicuous and clearly visible from either side of the vehicle.

In the preferred embodiment of the invention shown in Figs. 1–9, inclusive, the same comprises a rectangular box-like casing 21 preferably open at its opposite sides and provided at its lower end with attaching flanges 22 for securing it to the automobile body. The upper portion of one side of the casing is preferably provided with a swinging door frame 23 hinged at 24 for permitting access to the interior of the casing when desired. This door may be provided with a suitable lock 25. Although this casing is preferably of rectangular form, it may be of any other desired shape.

The opposite sides of the casing are provided with means for presenting a characteristic foreground or setting, and for this purpose the open sides of said casing are provided with panes or panels 26, 27, preferably of glass or other transparent material. The door frame 23 may also be provided with a similar pane or panel 28. As shown in Figs. 2, 3 and 4, the opposing upper and lower edges of the panels 26, 28 and the corresponding edges of the casing and door frame meet in a horizontal joint 29. The upper and lower portions of the panel 27 are preferably provided on one side thereof with a colored surface 30, such, for example, as red, which is bright and conspicuous, while the central or intermediate portion 31 of said panel is left transparent. The corresponding lower portion of the panel 26 is provided with a similarly colored surface 32, while its upper portion 33 corresponding to and in line with the central portion 31 of the panel 27, is left transparent. The panel 28 of the door frame is provided with a like-colored surface 34 corresponding to and in line with the upper colored surface 30 of said panel 27. Thus, on either side of the casing 20 there is a central transparent bar or portion and above and below the latter there are portions of a conspicuous color forming a characteristic setting or ground for the indicating members of the device.

Arranged within the casing 20 and movable into and out of register with the transparent portions of the panels 26, 27, are two detecting or indicating members 35, 36, the former of which is adapted to indicate the owner's absence from his car and the latter the presence in the car of the owner or some authorized person. For this purpose, these indicating members are of the proper dimensions to occupy the area covered by the transparent portions 31, 33 of the panels 26, 27. The indicating member 35 is of the same color or characteristic nature as the colored portions of the panels 26, 27 and 28, while the indicating member 36 is of a contrasting color or of a different characteristic nature than said member 35 and said panels and is preferably provided with a highly finished reflecting surface, such as a mirror. Furthermore, these indicating members are preferably arranged to move in unison, so that when one is set in its operative or indicating position the other is automatically set in its inoperative or non-indicating position, and the preferred means for accomplishing this result are constructed as follows:

Arranged in the lower portion of the casing 20 is a row of upright posts or rods 37 which are securely fastened at their lower ends to the base of said casing while their upper ends terminate a suitable distance below the top thereof, as shown in Figs. 2, 3 and 4. Guided for vertical movement on these posts are the indicating members 35, 36 which may be identical in construction, each being provided with vertical openings 38 for engaging said posts. Coil springs 39 surround the lower ends of the latter and constantly tend to elevate the indicating members, the lower ends of the springs bearing against the base of the casing and the upper ends thereof bearing against the lower end of the indicating member 35. A spring catch 40 carried by one of the guide posts, preferably the central one, and having a downwardly facing stop shoulder 41 is adapted to limit the upward movement of the indicating members to properly position them in their operative positions. The indicating member 36, which indicates the owner's presence in his car, is preferably detachable from the guide posts and completely removable from the casing 20 through the door 23, while the absence-indicating member 35 is preferably permanently arranged within the casing. To permit of the removal of said member 36, the spring catch 40 is capable of being pressed inwardly within the cross-sectional area of its supporting post. Upon the removal of the presence-indicating member 36 from the posts 37, the absence member 35 is automatically elevated by the springs 39 to the position shown in Fig. 3, while upon applying said first-named member to the posts, the last-named member is forced downwardly and hidden from view between the lower colored portions of the panels 26, 27, as shown in Figs. 2 and 3. In this position, the indicating member 36 is clearly visible from opposite sides of the automobile through the transparent portions 31, 33 of said panels and the same stands out conspicuously against the contrasting red setting or ground of the casing.

In order to prevent ready duplication of the indicating members by unauthorized persons, and to permit of varying them for different automobiles, so that each of such members fits only the corresponding guide posts 37, the latter and the corresponding openings 38 in said members are preferably of different cross sectional areas, as shown in Figs. 5, 7 and 8, thus rendering it impossible for such persons to practice deception by the use of similar indicating or detecting members. To further guard against such practice, the several guide posts are provided near their upper ends with horizontal connecting webs or pins 42 and the indicating members are provided with corresponding upright slots 43 which engage said pins, as shown in Figs. 3, 7 and 8.

In the use of this device, when the owner or other authorized person occupies or drives the automobile, he sees to it that the removable indicating member 36 is properly fitted on the guide posts and that the door 23 is locked. In this position of the device, which is shown in Figs. 1, 2 and 4, said indicating member stands out conspicuously against the contrasting red ground formed by the colored portions of the respective panels 26, 27 and 28, serving as an indication to patrolmen and others that the vehicle is occupied by an authorized person. When the car is left standing or parked, the owner unlocks the door of the casing and removes the indicating member 36 therefrom, whereupon the indicating member 35 automatically springs upward to the position shown in Figs. 3 and 9, after which he again closes the door and locks it, said member 35 being visible through the transparent portions 31, 33 of the casing and forming, together with the colored portions 30, 32 and 34 of the latter, a uniformly and completely colored surface or ground indicating that the owner has left the car. In this position of the device, should the car be traveling along the streets, it will arouse the suspicion that the vehicle is being stolen and patrolmen and others can therefore promptly take the necessary steps to arrest the thief.

Although the indicating member 36 is preferably adapted to assume a position substantially in the center of a colored ground, it will be understood that the same may be arranged to assume any other contrasting position, for example, either above or below said ground.

In the embodiment of the invention shown in Figs. 10-15, inclusive, the indicating member 35ª is in the form of a box and guided for vertical movement on upright posts 37ª which pass through corresponding openings 38ª in the base of said box and are provided at their upper ends with heads 45 which serve to limit the upward movement of said indicating member. Coil springs 39ª serve to project the latter to its detecting position. The removable indicating member 36ª, in this instance, is of corrugated or irregular form and is guided at its ends in guideways 46 secured to the end walls of the casing 20ª. Connecting the upper ends of these guideways is a plate 47 provided with a slot 48 shaped to correspond to said indicating member 36ª, as shown in Fig. 14. A horizontally swinging finger piece 49 fulcrumed on one side of this plate serves to hold said indicating member in its operative position, shown in Figs. 10 and 12. Pins 50 projecting downwardly from the opposite lower ends of the removable indicating member facilitate its insertion in the guideways.

It will be understood from the foregoing that various other modifications may be made without departing from the spirit of this invention as covered by the appended claims.

In the claims the indicators or detectors 35, 35ª are designated as the "absence-indicators" and the removable detectors 36, 36ª as the "presence-indicators".

I claim as my invention:

1. A theft detector for automobiles and the like, comprising a characteristic ground, and a plurality of contrasting indicating members disposed one above the other and movable in a plane substantially parallel with said ground into and out of operative position relatively thereto, said means indicating the owner's absence from the automobile in one position thereof and his presence in another position.

2. A theft detector for automobiles and the like, comprising a characteristic ground, and contrasting indicating members facing in the same direction and movable in unison, the one into and the other out of operative position relatively to said ground.

3. A theft detector for automobiles and the like, comprising a characteristic ground, and indicating means movable into and out of operative position relatively to said ground, a portion of said indicating means being of the same characteristic nature as said ground and indicating the owner's absence from the automobile, and the other portion of said indicating means being of a different characteristic nature from said ground, and indicating the owner's presence in the automobile.

4. A theft detector for automobiles and the like, comprising a characteristic ground, and indicating members movable in unison into and out of operative position relatively to said ground, one of said members being of the same characteristic nature as said ground and indicating the owner's absence from the automobile, and the other member being of a different characteristic nature from said ground and indicating the owner's presence in the automobile.

5. A theft detector for automobiles and the like, comprising a casing having a portion of one of its walls provided with a characteristic ground, while another portion thereof is transparent, and indicating means arranged in said casing and movable into and out of register with the transparent portion of said casing, a portion of said indicating means being of the same characteristic nature as said ground and indicating the owner's absence from the automobile, and the other portion of said indicating means being of a different characteristic nature from said ground and indicating the owner's presence in the automobile.

6. A theft detector for automobiles and the like, comprising a casing having a portion of its side walls provided with a characteristic ground while another portion thereof is transparent, and indicating members arranged in said casing and movable into and out of register with the transparent portion of said casing, one of said members being permanently arranged within said casing and of the same identity as said ground and indicating the owner's absence from the automobile, and the other member being removably arranged in said casing and of a different characteristic nature from said permanent member.

7. A theft detector for automobiles and the like, comprising a casing having a colored portion and a transparent portion, a presence-indicator and an absence-indicator arranged in said casing and each movable into and out of register with the transparent portion of said casing, said presence-indicator being removable from said casing and controlling the movement of said absence-indicator, the latter being of the same color as the colored portion of said casing and the presence-indicator being of a contrasting color.

8. A theft detector for automobiles and the like, comprising a casing having a colored portion and a transparent portion, a presence-indicator and an absence-indicator arranged in said casing and each movable into and out of register with the transparent portion of said casing, said presence-indicator being removable from said casing and controlling the movement of said absence-indicator, and means for holding said indicators in their operative positions, said absence-indicator being of the same color as the colored portion of said casing and said presence-indicator being of a contrasting color.

9. A theft detector for automobiles and the like, comprising a casing having an opening, a door for closing said opening, said casing having a colored portion and a transparent portion, an absence-indicator of the same color as said colored portion arranged in said casing and movable into and out of register with said transparent portion, a presence-indicator of a color contrasting with said colored portion, arranged in said casing and movable into and out of register with said transparent portion, said absence-indicator being permanently located in said casing and said presence-indicator being removable therefrom, and means for locking said door.

10. A theft detector for automobiles and the like, comprising a casing having a colored portion and a transparent portion, a presence-indicator and an absence indicator movable into and out of register with the transparent portion of said casing, said absence-indicator being of the same color as the colored portion of said casing and said presence-indicator being of a contrasting color, means for retaining said indicators in their operative positions, and means for automatically changing the positions of said indicators when released from said retaining means.

11. A theft detector for automobiles and the like, comprising a casing having a colored portion and a transparent portion, a presence-indicator and an absence indicator arranged in said casing and movable in unison into and out of register with the transparent portion of said casing, one of said indicators being active while the other is inactive, means for holding said indicators in their operative positions, and means tending to move said indicators into engagement with said holding means, said absence-indicator being of the same color as the colored portion of said casing, and said presence-indicator being of a contrasting color.

12. A theft detector for automobiles and the like, comprising a casing having a colored portion and a transparent portion, guide posts arranged in said casing, superposed presence and absence indicators slidable on said posts to register with the transparent portion of said casing or break register therewith, and springs tending to move said indicators to their operative positons.

13. A theft detector for automobiles and the like, comprising a casing having a characteristic ground, an indicating member movable relatively to said ground, and means for guiding said member in said casing, said guiding means being of irregular formation and said indicating member being shaped to fit the same.

14. A theft detector for automobiles and the like, comprising a casing having a characteristic ground, an indicating member movable relatively to said ground, and guide rods of different cross sectional areas arranged in said casing, said indicating members being provided with corresponding openings engaging said rods.

JOSEPH J. MICHALSKI.